Figure 1:
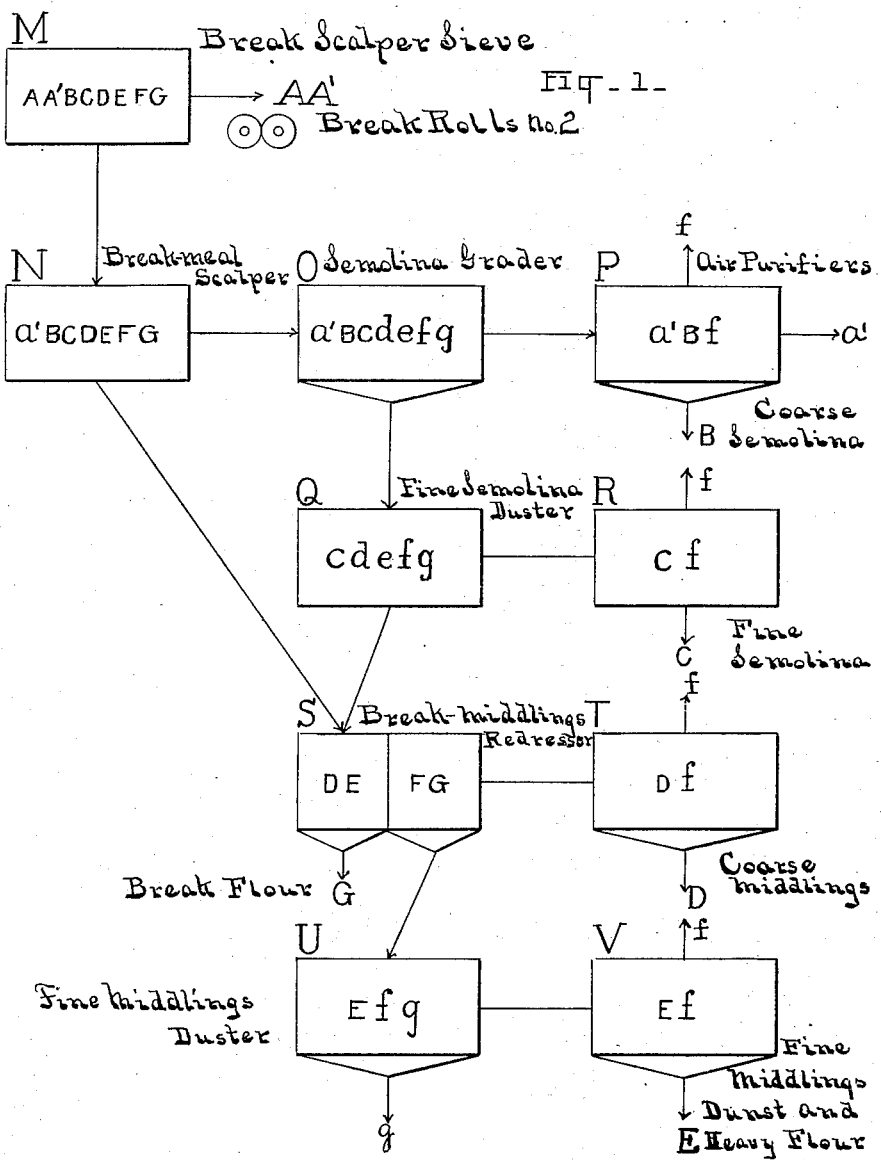

No. 687,601. Patented Nov. 26, 1901.
R. BUCHANAN.
FLOUR MILLING.
(Application filed June 14, 1901.)
(No Model.) 2 Sheets—Sheet 1.

WITNESSES
Norris A. Clark.
Alex. Scott.

INVENTOR
Robert Buchanan,
By Geo. W. Lindsay
ATTY

UNITED STATES PATENT OFFICE.

ROBERT BUCHANAN, OF LIVERPOOL, ENGLAND.

FLOUR-MILLING.

SPECIFICATION forming part of Letters Patent No. 687,601, dated November 26, 1901.

Application filed June 14, 1901. Serial No. 64,559. (No specimens.)

*To all whom it may concern:*

Be it known that I, ROBERT BUCHANAN, a citizen of Great Britain, residing at Liverpool, in the county of Lancaster, England, have invented certain new and useful Improvements in Flour-Milling, of which the following is a full, clear, and exact description.

In a modern automatic roller-mill plant for the manufacture of flour the prepared wheat is usually subjected to four or more successive passages between fluted break-rolls. After passing between each pair of the fluted break-rolls the material is conveyed to a break-scalping-sieve reel or centrifugal machine which separates the finer from the coarser material, and it is only the unfinished branny products which are conveyed to the succeeding break-rolls. This coarser material from the fourth or last break-scalper is bran, which is not further treated. The finer material from the first, second, and third break-scalpers is what is known as "break-meal" (consisting of break-flour, break-dunst, break-middlings, and semolina mixed together) and is conveyed to and through a series of machines, including break-meal scalpers, break-meal redressers, and fine semolina and middlings dusters, by which the break-flour is separated from the break-dunst, the coarse and fine middlings, and the coarse and fine semolina and in which the latter materials are dusted, prepared, and graded for purification in purifiers. The products from the later break or breaks are dealt with separately in a similar manner, and all the products excepting flour and bran pass, after separation and purification, to the smooth or reduction rollers, where they are made into flour.

The accompanying diagrams illustrate the ordinary process of manufacture in Figure 1 and my improved process in Fig. 2 and will be hereinafter referred to.

In the ordinary process, for example, the mixed products of the first break-roll are separated into the following constituent elements: A, chop for the next break; A', finer chop for break or other fluted rolls; B, coarse semolina; C, fine semolina; D, coarse middlings; E, fine middlings, dunst, and heavy flour; F, beeswing and light branny particles; G, light flour and dust.

In the diagrams and in the following description where the separation is not complete large quantities are indicated by capital letters and smaller quantities passing over with the larger quantities are indicated by small letters of reference. In the diagrams horizontal lines indicate the course of the tailings, downward lines (whether sloping or vertical) the course of the throughs, and upward lines (whether sloping or vertical) the course of the material carried upward by the air in air purification, which I may conveniently refer to as "liftings."

Referring to Fig. 1, M indicates the break-scalper sieve or cylinder, to which in the ordinary process of flour-milling the whole product A A' B C D E F G from a break-roll goes. The tailings A A' of the break-scalper are the feed for the next succeeding break-roll.

N indicates the break-meal scalper, to which go the throughs from the scalper M, (consisting of $a'$ B C D E F G, mixed together.)

O indicates a semolina-grader, to which go the tailings of the break-meal scalper, (consisting of $a'$ B C $d\, e\, f\, g$,) which will be mainly the semolinas B C, with portions of $a'\, d\, e\, f\, g$.

Q indicates a fine semolina-duster, to which go the throughs of the semolina-grader O.

S indicates a break-middlings redresser, to which go the throughs from both N and Q. The throughs from S are separated into G (which is ordinarily known as "break-flour") and E, $f$, and $g$, which go to U, a fine middlings-duster. The tailings from O, Q, S, and U go to air-purifiers P, R, T, and V, respectively, as shown by the diagram Fig. 1.

The foregoing description shows that the middlings, flour, and dunst pass after separation from the coarse and fine semolina to centrifugal or other dressing machines, known as "break-middings redressers" and "fine middlings and dunst dusters," successively, as shown by the diagram, whereby the break-flour (which consists of the true original break-flour made by the break-rolls and the finer and softer flour made by attrition in the course of the material through the machines just described) is separated from the remaining products, which are divided into coarse middlings, fine middlings, and dunst.

The above is a fair illustration of an ordinary milling process of the best type in use at the present time in first-class flour-mills. In this method of milling the scalping, dressing, and other sieving operations employed must necessarily be sufficiently energetic and violent to produce the required separations, and I have found that the use of such energetic or violent methods of separation upon a mixture of break products containing branny particles is to pulverize a notable proportion of such branny particles with their adherent impurities and to reduce them to the same degree of fineness as the break-flour, from which they cannot be separated by subsequent operations. The flour so produced may be denominated "attrition-flour" in order to distinguish it from the true break-flour, which is produced by the crushing effect of the rolls. Owing to the presence of this attrition-flour the so-called "break-flour" which is produced with the ordinary process is of low quality and is inferior in color, and consequently inferior in market value, in comparison with the flour which is made upon the smooth rollers from the purified semolina and middlings.

The result of my experiments is to show that the so-called "break-flour" produced in the ordinary process consists of about one-third true break-flour made by the break-rolls and about two-thirds attrition-flour.

The object of my invention is to diminish the proportion of so-called "break-flour" which is produced and to simplify and improve the process, and it depends upon the following facts, which I have discovered as the result of a long series of experiments: First, I have found that, as above stated, in the ordinary process the so-called "break-flour" is not, as its name would imply, chiefly the product of the break-rolls, but is produced to a greater extent in the break-scalpers, break-meal scalpers, break-meal redressers, and fine semolina and middlings dusters and in the conveyers, elevators, and spouts which are required for the conveyance of the material from one machine to another. Second, this fact having been ascertained after a prolonged research I have further found that by avoiding violent or energetic separating operations upon material containing branny particles, and by employing air purification for materials containing branny particles, and by making certain modifications in or in connection with the air-purifiers it is possible effectually to separate and purify the products of a break without first separating the break-flour in intermediate machines, and so to avoid the production of branny attrition-flour. Third, I have found that while the presence of attrition-flour, which is finer and softer than true break-flour, is an impediment to efficient air purification the true break-flour made by the rolls is no impediment thereto. By avoiding violent or energetic action before air purification I am able to prevent the formation of attrition-flour and secure so small a proportion of so-called "break-flour" that the mixed break products can be efficiently separated by air purification. Taking the actual products coming from the first, second, and third breaks, the proportion of break-flour is so low that air purification can be efficiently used for separation if any preliminary violent or energetic action on the material is avoided. My invention is based upon these facts, and in carrying out my invention I may convey the product from the earlier break-rolls direct to the air-purifiers and am able to make these purifiers when suitably clothed perform all the functions of the intermediate machines, as well as the functions which they discharged formerly, the materials from the later breaks being treated by the intermediate machines in the ordinary manner, as hereinbefore described; but in order to relieve the purifiers from having to deal with so large a bulk of material in the application of my invention which I prefer I make use of a preliminary sieve, which will skim off the bulk of the unfinished coarse branny products for conveyance direct to the succeeding break process, or, with less advantage, I may employ a preliminary centrifugal or reel to separate the coarser materials of the break instead of the sieve; but in either case the treatment must be gentle and light; otherwise attrition-flour would be formed, which would interfere with the efficiency of the subsequent air purification and defeat the objects of my invention.

Figure 2:
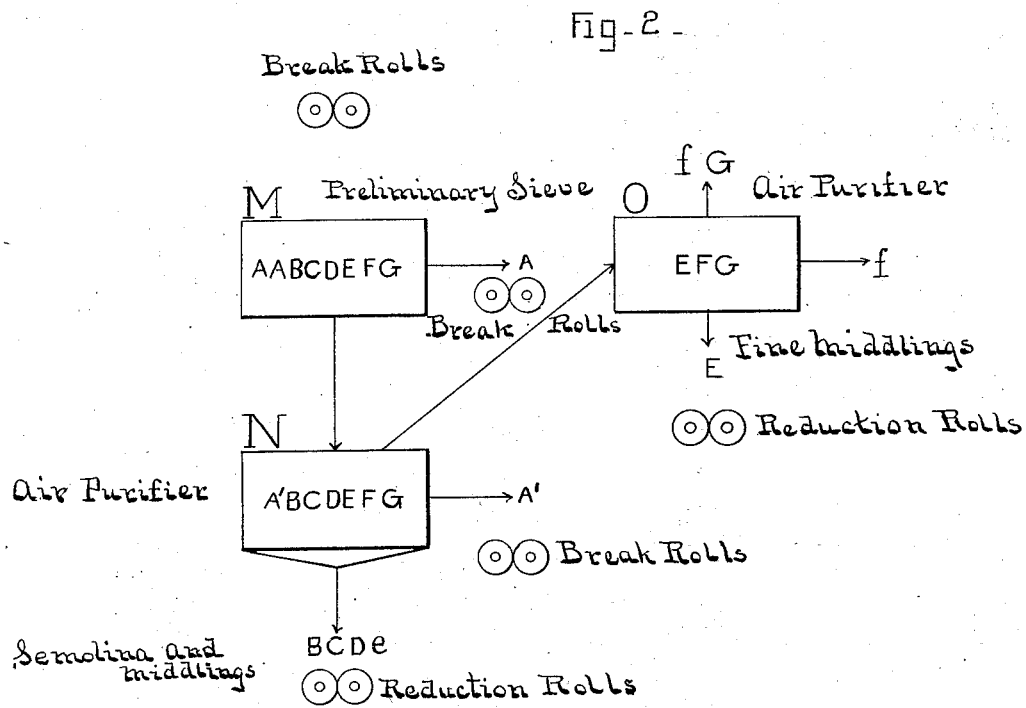

The method of applying my improved process which I prefer and which most fully realizes the advantages of my invention is illustrated by the diagram Fig. 2 of the accompanying drawings.

The whole chop from the break-rolls is taken to a preliminary sieve M, the feed of which is therefore composed of A A' B C D E F G. The tail of this sieve is A, the bulk of the feed for the next succeeding break-roll. The throughs of the sieve A' B C D E F G are taken direct to an air purifier or purifiers N. The tails of the latter are A', going to the next break or other fluted rollers. The throughs of the purifier or purifiers are B C D e, ready for passing direct to the reduction-rolls. The liftings (portions removed or lifted by the action of the exhaust or air currents) are E F G, which may be treated as described previously in the ordinary process, but which I prefer to take direct to a secondary air-purifier O, as indicated on the diagram, and there separated and made suitable for passing to the reduction system in the ordinary manner.

The clothing of the preliminary sieve should be sufficiently coarse to allow the throughs to pass without such severe treatment as to cause the production of attrition-flour. For instance, with soft wheats the mesh may be about twelve per inch for first and second breaks and about fourteen for third break. On the other hand, with some hard wheats it may be possible to clothe the sieve with finer numbers and still avoid the production of an undue quantity of attrition-flour.

The sieve or sieves of the air purifier or purifiers are clothed with silk cloths having successively about seventy, fifty-six, forty, thirty, and twenty threads per inch for ordinary hard wheats. It will be understood, however, that the number of meshes to the inch and the number of different sifting-surfaces may be varied to adapt them to different qualities and hardnesses of wheat; but the principle of my invention being understood the practical miller will have no difficulty in determining the best numbers to suit any special case.

The tailings from the purifier are conveyed, together with the tailings from the preliminary sieve, either with or without further preparation or dusting, to the next succeeding break-rolls or other fluted rolls. The throughs from the air-purifiers are conveyed to the reduction roller-mills and are treated in the ordinary manner.

In the above operations the material is not subjected to any violent or energetic action, such as is employed in the ordinary process, while it contains branny particles; but while it is the purpose of my invention to avoid all violent or energetic action upon material containing branny particles, such as is produced in the ordinary scalping, sifting, and dressing operations, I have found that it is an advantage to pass a certain amount of fine chop and branny materials along with the other materials to the air-purifiers. In the first place, the attrition of such branny material under air purification is very small, and the complete separation by air purification as opposed to the ordinary method is one of my objects. In the next place, by allowing the fine chop to pass to the air-purifiers I can use a preliminary sieve of so coarse a mesh that very little work has to be done on the material in getting it through the sieve, and the production of attrition-flour is avoided. In the third place, the presence of this fine chop in the air-purifier, so far from being detrimental to the operation, actually assists it by keeping the material more open and assisting to prevent choking of the sieves, particularly with soft wheats.

The preliminary sieve is not essential to the success of my improved process; but if it is not used the bulk to be dealt with by the purifier would be very large owing to the presence of the coarse chop, and this would require a reduction in the feed to the purifier. If the preliminary sieve were not used, the clothing of the purifier in order to carry out the process would, however, be much the same—i. e., from about seventy to twenty; but the output of the purifier per hour would be greatly reduced, although the advantage of my improved process in making a greatly-reduced proportion of attrition-flour would be realized if the feed were not too heavy.

In my improved process in contradistinction to every ordinary process of flour-milling I provide that the bulk of the pure product, consisting of semolina and middlings, shall be separated and sent on to the reduction system without the pulverization of the branny material, which has hitherto taken place. Air purification has no appreciable effect in pulverizing the branny particles, whereas the apparatus now in use for effecting the same separation as I effect by air separation (consisting of break-scalpers, break-meal scalpers, break-meal redressers, dusters, &c.) causes at each separation a fresh quantity of bran, semolina, and middlings to be pulverized, which adds to the bulk of the so-called "break-flour" and discolors it by the contamination of the branny particles. Thus I avoid the production of about two-thirds of the so-called "break-flour," and the remaining one-third, which consists of true break-flour, being saved from contamination, is nearly as valuable a product as the flour from the reduction system. In addition to this improvement of the product the simplification of the whole plant is very great and there is a proportionate reduction of cost.

Having now particularly described my said invention, I declare that what I claim is—

1. The process of flour-milling herein shown and described, which consists in separating the coarse and fine chop, coarse and fine semolina, coarse and fine middlings, dunst, heavy flour, beeswing and light branny particles, light flour and dunst by sifting, thus first eliminating the coarse chop, and then separating the remaining products by air purification into tailings (fine chop), throughs (coarse and fine semolina, coarse and fine middlings) and siftings (beeswing, light bran, flour and dunst), so as to avoid the production of attrition-flour, substantially as set forth.

2. In the process of roller flour-milling, separating the coarser portion of the chop and conveying it to the break-rolls for further crushing; conveying the finer portion of the chop to air-purifiers and there separating it into fine chop which also is returned to the break-rolls for further crushing, into coarse and fine semolinas and a proportion of fine middlings, dunst, and heavy flour which are conveyed to the smooth reduction-rollers for conversion into flour, and into a residue of fine middlings, dunst, heavy flour, beeswing, light branny particles, light flour, and dust, which are conveyed to and separated in a secondary air-purifier, the throughs from which are conveyed to smooth reduction-rollers and converted into flour, while the liftings and tailings therefrom are graded as bran and offal, substantially as hereinbefore described.

3. In the process of roller flour-milling, conveying the chop from the break-rolls direct to air-purifiers and therein separating it into chop which is returned to the break-rolls, into coarse and fine semolinas and a proportion of fine middlings, dunst, and heavy flour, which are conveyed to the smooth reduction-rollers for conversion into flour and into a residue of fine middlings, dunst, heavy flour, beeswing, light branny particles, light flour, and dust, which are conveyed to a secondary air-purifier, the throughs from which are conveyed to the smooth reduction-rollers for conversion into flour, while the liftings and tailings therefrom are graded as bran and offal, substantially as hereinbefore described.

4. In the process of roller flour-milling, separating the coarser portion of the chop and conveying it to the break-rolls for further crushing, conveying the finer chop to air-purifiers and therein separating it into fine chop which also is conveyed to the break-rolls, into coarse and fine semolinas with a proportion of fine middlings, dunst, and heavy flour, which are conveyed to the smooth reduction-rollers for conversion into flour, and into a residue of fine middlings, dunst, heavy flour, beeswing, light branny particles, light flour, and dust, which are thereafter graded and treated in the usual manner, substantially as hereinbefore described.

5. In the process of roller flour-milling, conveying the chop from the break-rolls to air-purifiers and therein separating it into chop, which is returned to the break-rolls for further crushing, coarse and fine semolinas with a proportion of fine middlings, dunst, and heavy flour, which are conveyed to the smooth reduction-rollers for conversion into flour, and a residue of fine middlings, dunst, heavy flour, beeswing, light branny particles, light flour, and dust, which are thereafter treated and graded in the usual manner, substantially as hereinbefore described.

6. In the process of roller flour-milling, separating the chop into two portions, of which the coarser portion is returned to the break-rolls and the remainder is conveyed to air-purifiers by which it is separated into throughs, which are subsequently ground into flour, into tailings, which are subsequently separated into flour products, bran, and offal, and into liftings consisting of bran and offal, substantially as hereinbefore described.

In witness whereof I have subscribed my signature in presence of two witnesses.

ROBERT BUCHANAN.

Witnesses:
JNO. McFADEGAN,
JOHN W. McCOLL.